(12) United States Patent  
Tan et al.

(10) Patent No.: US 12,537,095 B2
(45) Date of Patent: Jan. 27, 2026

(54) HEALTH CARE PROVIDER DATA SYSTEMS PROCESSING AND ANALYTICS

(71) Applicant: Haemonetics Corporation, Boston, MA (US)

(72) Inventors: Melvin Tan, Edmonton (CA); James Odeen, Edmonton (CA); Christopher Cairns, Edmonton (CA); Ronald Sheehan, Trophy Club, TX (US)

(73) Assignee: Haemonetics Corporation, Boston, MA (US)

( * ) Notice: Subject to any disclaimer, the term of this patent is extended or adjusted under 35 U.S.C. 154(b) by 0 days.

(21) Appl. No.: 18/798,949

(22) Filed: Aug. 9, 2024

(65) Prior Publication Data

US 2024/0404688 A1 Dec. 5, 2024

Related U.S. Application Data

(63) Continuation of application No. 17/271,194, filed as application No. PCT/US2019/048147 on Aug. 26, 2019, now abandoned.

(Continued)

(51) Int. Cl.
*G16H 40/20* (2018.01)
*G06N 5/01* (2023.01)
(Continued)

(52) U.S. Cl.
CPC .............. *G16H 40/20* (2018.01); *G06N 5/01* (2023.01); *G06Q 10/06393* (2013.01); *G16H 40/40* (2018.01); *G06Q 50/22* (2013.01)

(58) Field of Classification Search
CPC ........ G16H 40/20; G16H 40/40; G16H 70/00; G06N 5/01; G06N 20/00; G06Q 10/06393;
(Continued)

(56) References Cited

U.S. PATENT DOCUMENTS 8,086,604 B2 12/2011 Arrouye et al.
8,271,413 B2 9/2012 Agarwal et al.
(Continued)

FOREIGN PATENT DOCUMENTS

CN 105023073 11/2015
CN 105023073 A * 11/2015
(Continued)

OTHER PUBLICATIONS

Price, W. Nicholson, II. Regulating Black-Box Medicine. Michigan Law Review 116.3: 421(54). Michigan Law Review Association. (Dec. 2017) (Year: 2017).*

(Continued)

*Primary Examiner* — Linh Giang Le
(74) *Attorney, Agent, or Firm* — McCarter & English, LLP; Jonathan C. Lovely

(57) ABSTRACT

A method for generating a directive for maintaining an objective includes integrating a control center system with a plurality of healthcare provider data systems and obtaining information from the healthcare provider data system(s). The method may then use artificial intelligence to correlate the obtained information against an identified business objective of a donation center and generate, using a heuristic model, a directive to the donation center(s) to achieve the identified business objective. The method may then present the directive a user and/or user system such that the directive may carried out.

40 Claims, 16 Drawing Sheets

Related U.S. Application Data

(60) Provisional application No. 62/722,929, filed on Aug. 26, 2018.

(51) Int. Cl.
*G06Q 10/0639* (2023.01)
*G16H 40/40* (2018.01)
*G06Q 50/22* (2018.01)

(58) Field of Classification Search
CPC ...... G06Q 50/22; G06Q 50/10; G06Q 10/087; G06Q 10/1057
See application file for complete search history.

(56) References Cited

U.S. PATENT DOCUMENTS

| | | |
|---|---|---|
| 2003/0078808 A1 | 4/2003 | Ng et al. |
| 2004/0122704 A1* | 6/2004 | Sabol .............. G07C 9/37 706/45 |
| 2007/0118399 A1 | 5/2007 | Avinash et al. |
| 2007/0130206 A1 | 6/2007 | Zhou et al. |
| 2009/0177495 A1* | 7/2009 | Abousy .............. G16H 40/67 705/3 |
| 2010/0205044 A1 | 8/2010 | Scheer |
| 2015/0186834 A1 | 7/2015 | Mickles et al. |
| 2021/0335487 A1 | 10/2021 | Tan et al. |

FOREIGN PATENT DOCUMENTS

| | | |
|---|---|---|
| JP | 2004-318764 | 11/2004 |
| JP | 2004-318764 A | 11/2004 |
| JP | 2005-293559 | 10/2005 |
| JP | 2005-293559 A | 10/2005 |
| KR | 10-2018-0036285 A | 4/2018 |

OTHER PUBLICATIONS

Price, Regulating Black-Box Medicine. Mich Law Rev. 2017;116(3):421-74.
International Search Report and Written Opinion for Application No. PCT/US2019/048147, dated Nov. 7, 2019, 13 pages.
U.S. Appl. No. 17/271,194, filed Feb. 24, 2021, 2021-0335487.
Korea Disease Control and Prevention Agency of the Ministry of Health and Welfare of South Korea, Korean Blood Monitoring System Operation Guide. The Korean Society of Blood Transfusion. 98 pages, Sep. 2017.
Korean Office Action for Application No. 10-2021-7008593, dated Oct. 28, 2024, 16 pages.

* cited by examiner

HEALTH CARE PROVIDER DATA SYSTEMS PROCESSING AND ANALYTICS

PRIORITY

This application is a continuation of, and claims priority from co-pending U.S. application Ser. No. 17/271,194, entitled "Health Care Provider Data Systems Processing and Analytics", filed Feb. 24, 2021, and naming Melvin Tan, James Odeen, Christopher Cairns, and Ronald Sheehan as inventors, the disclosure of which is incorporated herein, in its entirety, by reference.

U.S. application Ser. No. 17/271,194, in turn, is a 35 U.S.C. § 371 national stage filing of International Application No. PCT/US2019/048147, filed on Aug. 26, 2019, and naming Melvin Tan, James Odeen, Christopher Cairns, and Ronald Sheehan as inventors, the disclosure of which is incorporated herein, in its entirety, by reference.

PCT Patent Application No. PCT/US2019/048147 claims priority from U.S. Provisional Application No. 62/722,929, filed Aug. 26, 2018, entitled "Health Care Provider Data Systems Processing and Analytics," and naming Melvin Tan, James Odeen, Christopher Cairns, and Ronald Sheehan as inventors, the disclosure of which is incorporated herein, in its entirety by reference.

TECHNICAL FIELD

The present invention relates to healthcare provider data systems, and more particularly to a command center for a integrating a number of healthcare provider data systems for processing and analytics.

BACKGROUND ART

Healthcare providers collect and maintain a large amount of information and data regarding their business including: donors, patients, staff, productivity, performance, quality, inventory, costs, etc. However, these healthcare providers rely on data reports to understand their operational conditions for performance improvements, corrective actions, risk mitigation, and other business needs of the same. The reports are manually generated by staff or automatically generated by a computerized system to provide a retrospective insight to the business. A healthcare provider staff member will then analyze the data from the reports and make decisions to adjust conditions/procedures to improve productivity.

SUMMARY OF THE EMBODIMENTS

In accordance with some embodiments of the present invention, a method includes integrating with a plurality of healthcare providers data systems and obtaining information from the data system. The method may then use artificial intelligence to correlate the information against an identified business objective, and use heuristics to arrange a directive to achieve the business objective. The method may then present the directive to a plurality of users or user systems at a relevant time. In some embodiments, the integration may be autonomous. In other embodiments, the integration is done live (i.e., as the data is received while business operations are occurring in production).

The data system may be a donor system, a screening system, a collection system, an equipment system, a supplies system, an inventory system, a testing system, a shipping system, a quality system, a payment system, a marketing system, a recruitment system, an engagement system, a warehouse system, a payroll system, a time-tracking system, a security system and/or a another data system. The information from the plurality of data systems may be timing data, telemetry data, performance data, quality data, cost data, volume data, quantity data, rate data, personnel data, donor data, donation data, productivity data, performance data, and/or speed data.

In some embodiments, the business objective may be an inferred profile of the healthcare provider based on historical information from the healthcare providers data systems. In other embodiments, the business objective may be supplied by the healthcare provider themselves without being inferred by the system. The business objective may include productivity objectives, performance objectives and/or quality objectives. The inferred profile and the supplied company profile may contain location-specific profiles and/or time-dependent profiles. The business objective may be measurable.

The directive may include supplementing information about steps to take to achieve the business objective. The supplementing information may be location-specific to achieve the business objective. In some embodiments, the directive may be presented to a plurality of users via e-mail, a SMS, a push notification, a telephone call, a social media publication, a visual feedback, an audible feedback, or a haptic feedback. Additionally or alternatively, the directive may be presented to a plurality of user systems via an electronic interface and/or user performed manual file upload. In other embodiments the directive may be presented to a plurality of users in a method that can be accessed from a cellphone, a tablet, a computer, a laptop, a personal digital assistant, a digital display, a smart watch, a telephone, a pager, or a public-address system.

In accordance with additional embodiments, a recordable media having recorded and stored instructions, that when executed on a computing device, performs actions including obtaining information regarding a plurality of locations and correlating the location-specific information with a plurality of time-specific information. The actions may also include identifying a business objective of a healthcare provider with a plurality directives, selecting directives that pertain to the business objective, and providing the directive to the company. The business objective may be based on (a) the location for which the business objective pertains and/or (b) the time for which the business objective pertains. The directive may be provided for review by the user or execution by a user system to achieve the business objective.

In accordance with further embodiments, a system includes a first interface to gather information corresponding to a plurality of healthcare provider data systems, a heuristics module and an artificial intelligence module. The heuristics module may identify a location-specific, time-dependent business objective that is not being achieved. The artificial intelligence module may (a) select information regarding the business objective, (b) predict steps to take to achieve the business objective and (c) modify the information with directives that include steps to take. The system may also include a second and third interface. The second interface may be arranged to provide (a) for review by a user or (b) for review by a user system the directive to perform. The third interface may be arranged to receive acknowledgement that the directive was (a) received by the user or (b) received by the user system. The artificial intelligence module may also (a) select information regarding the business objective, (b) select information regarding the directive provided for review by a user or user system, (c) correlate the directive with the business objective and (d) identify the effectiveness of the directive against the business objective.

A method for generating a directive for maintaining an objective (e.g., a business directive) may integrate a control center system with a plurality of healthcare provider data systems and obtain information from at least one of the healthcare provider data systems. The method may then correlate, using artificial intelligence, the obtained information against an identified business objective of a donation center and generate, using a heuristic model, a directive to the donation center(s) to achieve the identified business objective. The method may then present the directive to a user and/or user system such that the directive may carried out by the user and/or user system.

In some embodiments, integrating the control center system with the healthcare provider data systems may include autonomously integrating the control center system. The data systems may include a donor system, a screening system, a collection system, an equipment system, a supplies system, an inventory system, a testing system, a shipping system, a quality system, a payment system, a marketing system, a recruitment system, an engagement system, a warehouse system, a payroll system, a time-tracking system, and/or a security system. The information from the healthcare provider data systems may include timing data, telemetry data, performance data, quality data, cost data, volume data, quantity data, rate data, personnel data, donor data, donation data, productivity data, performance data, and/or speed data.

The business objective may be an inferred profile of the donation center based on historical information from the plurality of healthcare providers data systems. The method may also include receiving a company profile that includes productivity objectives, performance objectives and/or quality objectives. The business objective may be based, at least in part on, the productivity objectives, performance objectives and/or quality objectives. The business objective may include a received company profile containing location-specific profiles and/or time-dependent profiles, and the business objective may be measurable.

The directive may include information regarding at least one step to take to achieve the business objective and/or the directive information may be location-specific to achieve the business objective. The method may present the directive to the users via e-mail, a SMS, a push notification, a telephone call, a social media publication, a visual feedback, an audible feedback, and/or a haptic feedback. Additionally or alternatively, the directive may be presented to the user systems via an electronic interface (e.g., an automated electronic interface) and/or via a user performed manual file upload. The directive may be presented to the plurality of users such that the directive can be accessed from a cellphone, a tablet, a computer, a laptop, a personal digital assistant, a digital display, a smart watch, a telephone, a pager, and/or a public-address system.

In additional embodiments, the method may store, in a data storage device, the information from the healthcare provider data systems. Additionally or alternatively, the method may obtain the information by extracting, using a data extractor, the information from the healthcare provider data systems. The healthcare provider data systems may include a donor management system. Generating the directive may include identifying gaps between a production metric based on the obtained information and the business objective. The method may also receive, from a user, an acknowledgement that the user has taken ownership of implementing the directive and/or monitor, using artificial intelligence, an effectiveness of the directive against the business objective.

In accordance with further embodiments, a system for generating a directive for maintaining an objective may include an integrator configured to integrate a control center system with at least one healthcare provider data system, and a data extractor configured to search the healthcare data system(s) for production data. The data extractor may also retrieve the production data from the healthcare provider data system(s). The system may also include a data storage device that stores the retrieved production data and an artificial intelligence module. The artificial intelligence model may correlate the retrieved production information against an identified business objective and generate a directive to achieve the identified business objective. A virtual digital assistant may process the directive and distribute the directive to a recipient (e.g., a user and/or a donor management system) so that the recipient may carry out the directive. The artificial intelligence module may generate the directive using an heuristics model.

The integrator may autonomously integrate the control center system with the healthcare provider data system(s). The business objective may be measureable and/or an inferred profile of the healthcare provider based on historical information from the healthcare provider data systems. Additionally or alternatively, the business objective may be based, at least in part on, the productivity objectives, performance objectives and/or quality objectives contained within a company profile.

The directive may include information regarding at least one step to take to achieve the business objective, and/or location-specific information to achieve the business objective. The virtual digital assistant may distribute the directive via e-mail, a SMS, a push notification, a telephone call, a social media publication, a visual feedback, an audible feedback, and/or a haptic feedback.

The system may also include an electronic interface, and the virtual digital assistant may distribute the directive to user systems via the electronic interface. Additionally or alternatively, the virtual digital assistant may distribute the directive to the user systems via a user performed manual file upload. The directive may be distributed to the recipient such that the directive can be accessed from a cellphone, a tablet, a computer, a laptop, a personal digital assistant, a digital display, a smart watch, a telephone, a pager, and/or a public-address system.

In other embodiments, the healthcare provider data systems may include a donor management system. The artificial intelligence module may identify a gap between at least one production metric and the business objective. The directive may be based, at least in part on the gap(s). The system may also include a directive listener that monitors, using artificial intelligence, the effectiveness of the directive against the business objective. An interface may receive acknowledgement that the directive was (a) received by the user or (b) received by the user system.

In accordance with additional embodiments, a non-transitory computer recordable medium may have computer executable instructions, that when executed on a computing device, performs actions including obtaining location-specific information regarding a plurality of locations and correlating the location-specific information with a plurality of time-specific information. The actions may also include identifying a business objective of a healthcare provider with a plurality directives and selecting directives that pertain to the business objective. The directives may be based on (a) the location for which the business objective pertains and/or (b) the time for which the business objective pertains. The actions may also include providing for (a) review by the user and/or (b) execution by a user system the directive for achieving the business objective.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
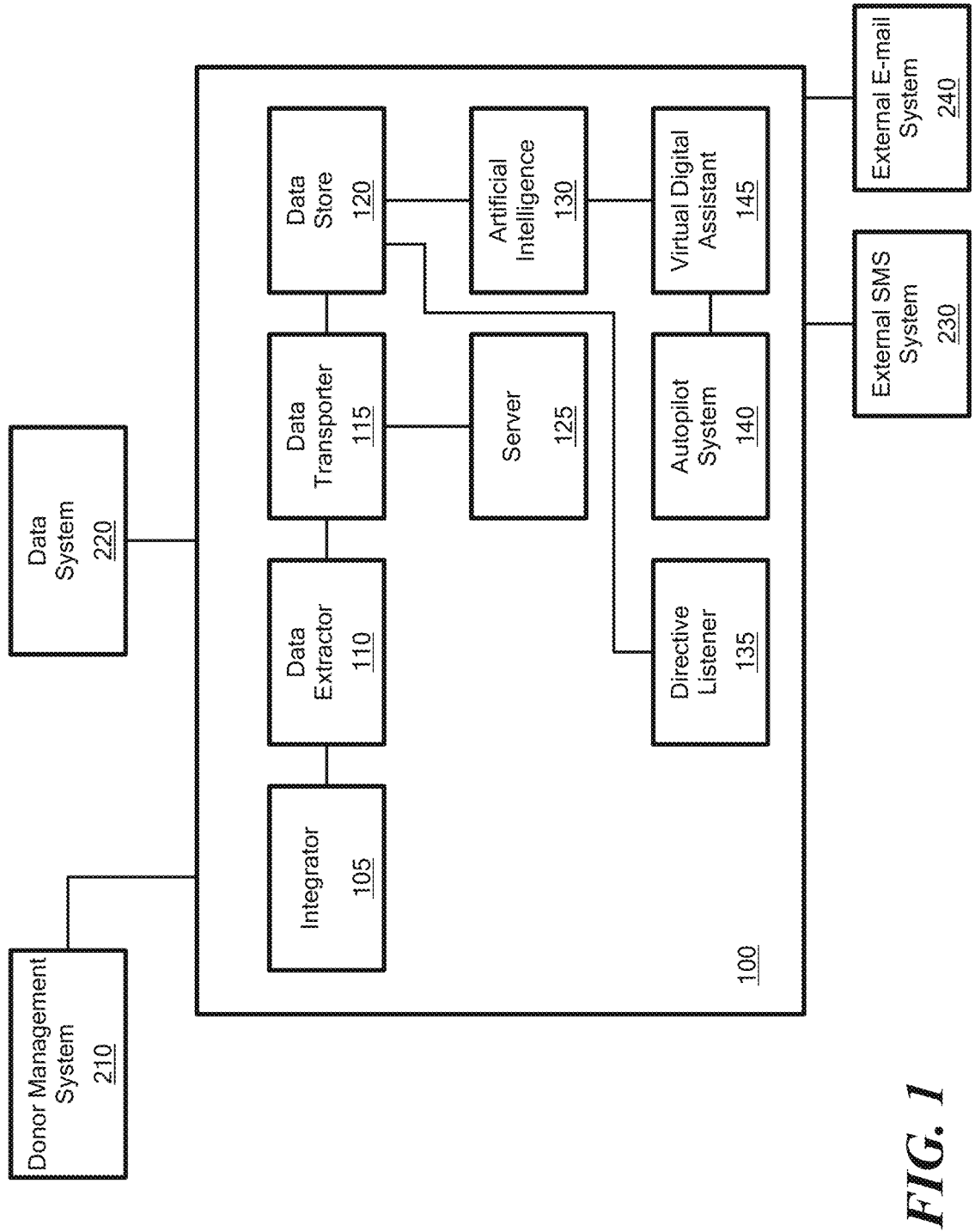
FIG. 1 shows a data systems processor and analytics control center system in accordance with some embodiments of the present invention

In illustrative embodiments, a data systems processor and analytics system for a healthcare provider integrates various data systems within the healthcare provider and utilizes a virtual digital assistant advisor with artificial intelligence processing and analytics to provide decision support (e.g., autopilot decision support) for the healthcare providers. Details of illustrative embodiments are discussed below.

Generally, systems and methods in accordance with various embodiments of the present invention integrate with a plurality of a healthcare provider's data systems to access large quantities of context-sensitive information. The systems and methods process this information using artificial intelligence subsystems to identify active or forecast emerging conditions, create personalized recommendations to modify the conditions, and present the recommendations as proactive guidance to healthcare provider staff. Such recommendations may be generated and presented by a virtual digital assistant advisor. Alternatively, the recommendations may be automatically executed without any staff involvement.

After obtaining information from a plurality of healthcare provider's data systems (e.g., telemetry data, timing data, performance data, and related metric data), systems and method in accordance with various embodiments of the present invention use the information to train an artificial intelligence data processor to identify conditions that are causing certain outcomes for a healthcare provider. Thereafter, these conditions are analyzed and processed by artificial intelligence subsystems into instructions that are given to a healthcare provider personnel through a plurality of methods, such as e-mail, SMS, push notification, telephone, social media, and related methods, to proactively notify the healthcare provider personnel of the conditions and to provide guidance for modifying the conditions to achieve a different outcome. Using a personal computing device, such as a cellphone, tablet, computer, laptop, personal digital assistant, smart watch, public address system, or related electronic communication technologies, the healthcare provider personnel can receive advice in the form of a notification from the invention's virtual digital assistant advisor and the personnel may subsequently access detailed information about the advice notification from any of the aforementioned computing devices. Additionally or alternatively, the invention may automatically perform the instructions without involvement of the healthcare provider personnel.

For example, with respect to plasma collection systems and donation systems, various embodiments may integrate with a plurality of a plasma collector's donor management data systems for large quantities of context-sensitive information. The system/method may then process this information using artificial intelligence subsystems to identify active or forecast emerging conditions. Based on these conditions, the system/method may create personalized recommendations to modify the conditions, and present the recommendations as proactive guidance to plasma center staff via a virtual digital assistant advisor or by automatically executing the recommendation without any staff involvement.

After obtaining information from a plurality of plasma collector's donor management data systems (e.g., telemetry data, timing data, performance data, and related metric data), the system and method may use the information to train an artificial intelligence data processor to identify conditions that are causing certain outcomes for the plasma center. Thereafter, the system/method analyzes the conditions and artificial intelligence subsystems process the condition and information into instructions that are given to the plasma center personnel through (e.g., via e-mail, SMS, push notification, telephone, social media, and related methods) to proactively notify the plasma center personnel of the conditions and to provide guidance for modifying the conditions to achieve a different outcome.

Using a personal computing device, such as a cellphone, tablet, computer, laptop, personal digital assistant, smart watch, public address system, or related electronic communication technologies, the plasma center personnel can receive advice in the form of a notification from a virtual digital assistant advisor and the personnel may subsequently access detailed information about the advice notification from any of the aforementioned computing devices. Alternatively, the invention may automatically perform the instructions without involvement of the plasma center personnel.

FIG. 1 schematically shows a control center system in accordance with some embodiments of the present invention. The control center system 100 programs or contains modules that perform the various functions discussed above. For example, the system 100 may have an integrator 105 that links to a donor management system 210 or any other data system 220 used by a plasma collector and/or plasma center and gives the system 100 access to the data recorded and stored within these external data systems. The system 100 also has a data extractor program/module 110 that searches for specific recorded production data from the plasma data systems 210/220 using the integrator 105. For example, depending on the application, the data extractor may search for donors, units, unit volumes, devices, supplies, shipment, date, time, users, stages, and anonymized data.

Once the data extractor 110 has found the required data/information, a data transporter 115 takes the data found by the data extractor 110 and electronically transports the data back to the system server 125. For example, the data transporter may transport the data over an internet connection from the source systems into the data systems processor and analytics system 100. The transport may be made over the internet and using a secure connection. Upon receipt of the data/information from the transporter 115, a data store 120 (e.g., a data storage device) receives the data and stores the data onto a recordable media. The data on the recordable media may be secured.

As shown in FIG. 1, the system 100 may also have artificial intelligence 130 (and/or may include or be connected to one or more neural networks) that reads the data stored in the data store 120. The artificial intelligence uses heuristics to analyze the data so that it can identify business objectives related to the operational performance of the plasma collector (or other blood processing center, healthcare provider, etc.) and analyze the live data so that it can measure and compare the live performance of the plasma collector against the business objective. If the live performance measure is not in line with (e.g., above or below) the business objective, the system 100 creates a step-by-step instruction intended to remedy the performance so that it is on par or better than the business objective. Collectively, this step-by-step instruction is called a directive.

Once the artificial intelligence program/module 130 (e.g., a machine learning module) generates the directive, it sends the directive to a virtual digital assistant 145. The virtual digital assistant 145, in turn, processes the directive for distribution to predetermined recipients. For example, the virtual digital assistant 145 may distribute the directive in a variety of methods including, but not limited to, displaying the directed on the system screen on the online notification feed, sending the directive to an external SMS system 230 so that the recipient may receive it as a text message on their mobile device, send the directive to an external e-mail system 240 so that the recipient may receive it as an e-mail, and/or sending the directive to an autopilot system for further processing (discussed in greater detail below).

As noted above, in some instances, the virtual digital assistant 145 may send the directive to an autopilot system 140. In such instances, the autopilot system 140 may automatically create new instructions for changing the operating parameters of the plasma center (or other healthcare provider) based on the directive. The instructions may be sent to the donor management system 210 and/or data system 220 for processing and disposition.

Upon receipt and completion of the directive and/or instructions, the donor management system 210 and/or data system 220 may provide feedback to the control center 100. To that end, the control center 100 may have a directive listener 135 that receives the feedback from the recipient of the directive and updates the records within the control center's data store 120. For example, the directive listener 135 may receive feedback indicating that the directive was received by the recipient, read by the recipient, assigned an owner by the recipient, and/or completed by the recipient/owner, to name but a few.

Figure 2:
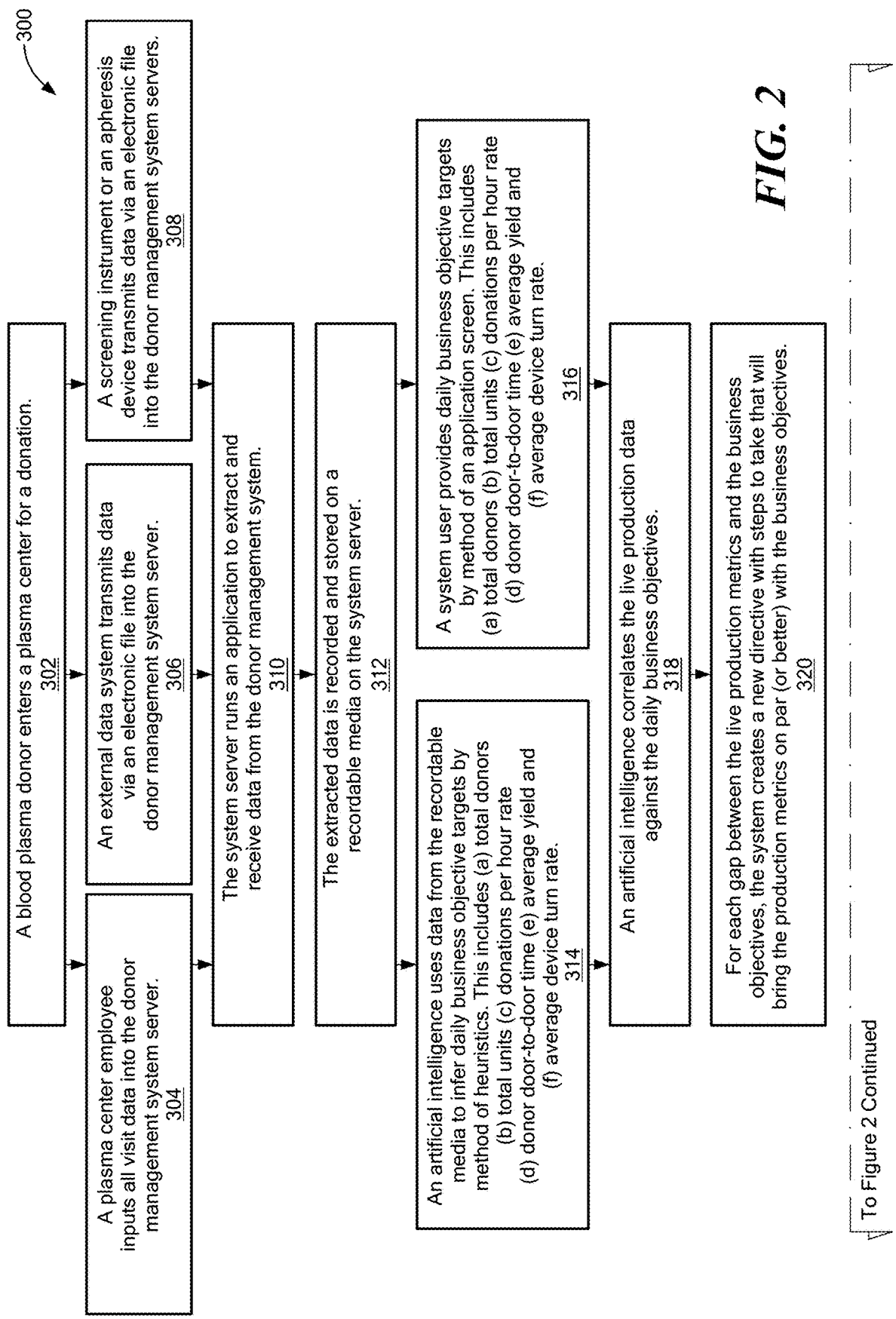
FIG. 2 is a flow diagram depicting a method of integrating data systems in accordance with various embodiments of the present invention.
Figure 2:
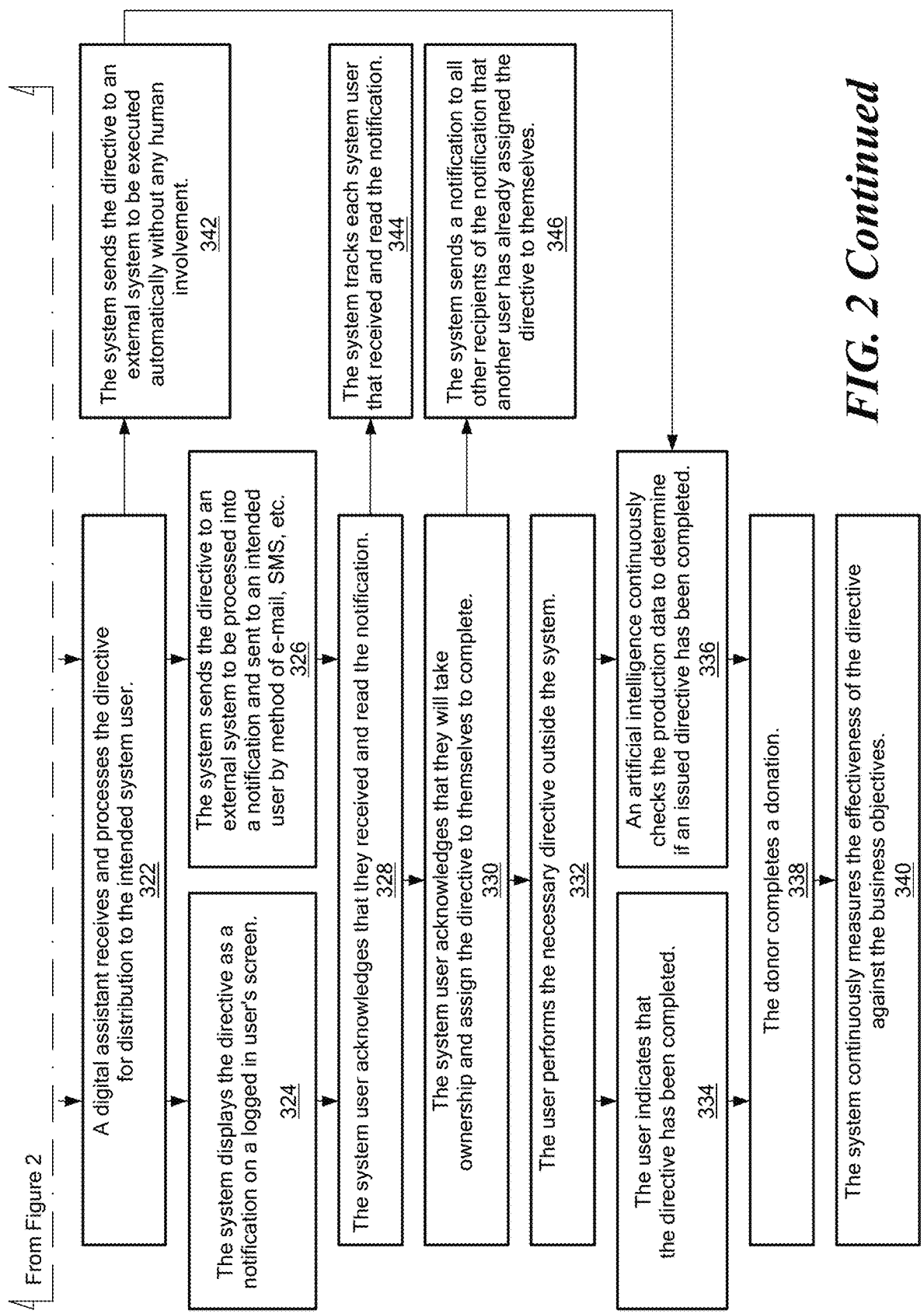

FIG. 2 schematically shows a flowchart depicting a method 300 of integrating data systems in accordance with various embodiments of the present invention. It should be noted that this method relates to a plasma donation center, but other embodiments may be used in other healthcare and non-healthcare applications. Initially, upon a blood plasma donor entering a plasma center for a donation (step 302), a plasma center employee enters all the visit data into the donor management system server (Step 304), an external data system transmits data via an electronic file to the donor management system server (Step 306), and a screening instrument or apheresis device transmits data via an electronic file to the donor management system server (Step 308). The method (e.g., the data extractor 110) may then run an application to extract and receive data from the donor management system 210 (step 310), and record/store the data on a recordable media (e.g., via the data store 120) on the system server 125 (Step 312).

Once the data is received and stored, the artificial intelligence 130 may use the data to infer daily business objective targets using heuristics (Step 314). The targets may include total donors, total units, donations per hour rates, donor door to door times, average yield and average device turn rate, to name but a few. Additionally or alternatively, a system user may also provide daily business objective targets using an application screen (Step 316). The method (e.g., the artificial intelligence 130) may then correlate the live production data against the business objectives (Step 318). For each gap between the live production and the business objectives, the method 300/system 100 creates a new directive that includes steps that the center may take to bring the production metrics on par (or better) with the business objectives (Step 320).

The digital assistant 145 may then receive these directives and process them for distribution to the appropriate system user (Step 322). For example, the method 300/system may display the directive as a notification on a logged-in user's screen (Step 324), send the directive to an external system (e.g., an SMS system 230 or e-mail system 230) to be processed into a notification and sent to an user (Step 326), or sent to an external system (or autopilot 140) to be executed automatically without human involvement (Step 342).

If the system 100/method 300 displays the directive or sends the directive to a user, the method 300 may then acknowledge that the user received and read the directive (Step 328), and the system user may acknowledge that they will take ownership of the directive and assign the directed to themselves for completion (Step 330). The user may them perform the necessary directive (e.g., outside of the system 100) (Step 332). It should be noted that during this time, the method may track each system user that receives and reads the notification (step 344) and may send a notification to all other recipients that another user is assigned to the directive (Step 346). Once it is complete, the user may indicate that the directive is complete (Step 334). For example, to acknowledge that the user has taken ownership of the task and/or that the task is complete, the user may click/press a button located on a user interface (e.g., a graphical user interface) located on the system 100 and/or their screen. Alternatively, the user may send a response (e.g., an e-mail, text message, etc.) back to the system 100 informing the system 100 that the task is assigned to the user and/or that the task is complete.

Once the directive is complete (e.g., via the user or automatically), the system 100/method 300 (e.g., the artificial intelligence 130) may continuously check the production data to determine if an issued directive has been completed (Step 336). The donor may then complete the donation (Step 338) and the system may continuously measure the effectiveness of the directive against the business objectives (Step 340). By continuously monitoring the production data and the effectiveness of the directive, the system 100 may create a new directive and/or alter the existing directive if there is a change in the data, business objective and/or the directive is not performing as expected.

It should be noted that various embodiments of the present invention can be used in any number of applications and for any number of business objectives and process management. For example, as shown in FIGS. 3A to 3E various embodiments may be used during the screening process. Additionally, as shown in FIGS. 4A to 4E, various embodiments may be used to determine donor processing rates. Lastly, as shown in FIGS. 5A to 5C various embodiments be used for supply management.

Figure 3A:
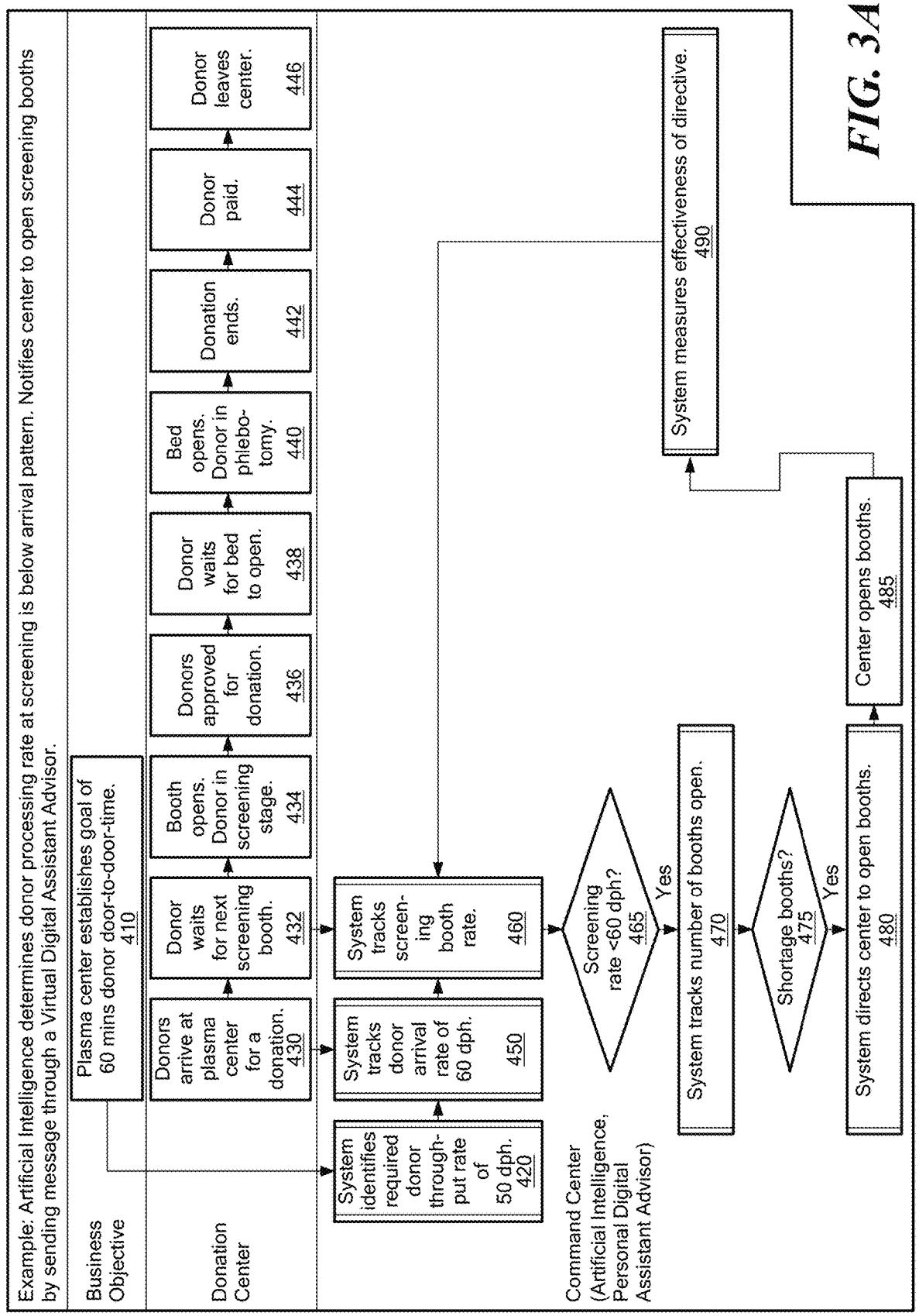
FIGS. 3A-3E schematically show flow diagram examples for various screening processes, in accordance with embodiments of the present invention.

FIG. 3A schematically shows the system 100 being used to meet and maintain a business objective of a specific donor door to door time (e.g., the time from when the donor first arrives to the time the donor leaves). For example, the donation center may establish or the system may infer a goal of 60 minutes (Step 410). The general flow of the donor through the donation process is that the donor first arrives at the plasma center for the donation (Step 430), waits for the next screening booth to open (Step 432), and then enters the screening process once a booth opens (Step 434). The screening process will determine if the donor is approved to donate (Step 436). The donor may then wait for a bed/donation device to become available (Step 438) and, once one is available, the donor begins the donation (e.g., he enters the phlebotomy stage) (Step 440). Once the donation is complete (Step 442), the donor is paid (Step 444) and may leave the donation center (Step 446).

After the donation/plasma center has established the business objective (Step 410) or the system 100 has inferred the business objective, the system 100 (or method) may then identify a required donor throughput to meet this business objective (e.g., in this case 50 donors per hour) (Step 420). The system 100 may then track the donor arrival rate (Step 450) to determine how many and how quickly donors are arriving and track a screening booth rate (Step 460) to determine how quickly the donors are being processed and/or screened at the booths. If the screening rate is below a threshold determined based, at least in part, upon the donor arrival rate (e.g., less than 50 donors per hour), the system 100 may track the number of booths that are open (Step 470) to determine if there is a shortage of booths (Step 475). If the system 100 determines that there is a shortage of open booths, the system 100 may generate a directive to the plasma center instructing the plasma center to open additional booths to meet the donor demand (Step 480). In response, the center may then open additional booths (Step 485) and the system 100 may continue to monitor the effectiveness of the directive (e.g., it may track the donor arrival rate, screening booth rate, number of open booths, etc.) to ensure that the directive is helping the center to meet the business objective (Step 490). If the directive is no longer helping to meet the business objective or the gathered data (e.g., the rates and number of booths mentioned above) changes, the system 100 may revise the directive.

Figure 3B:
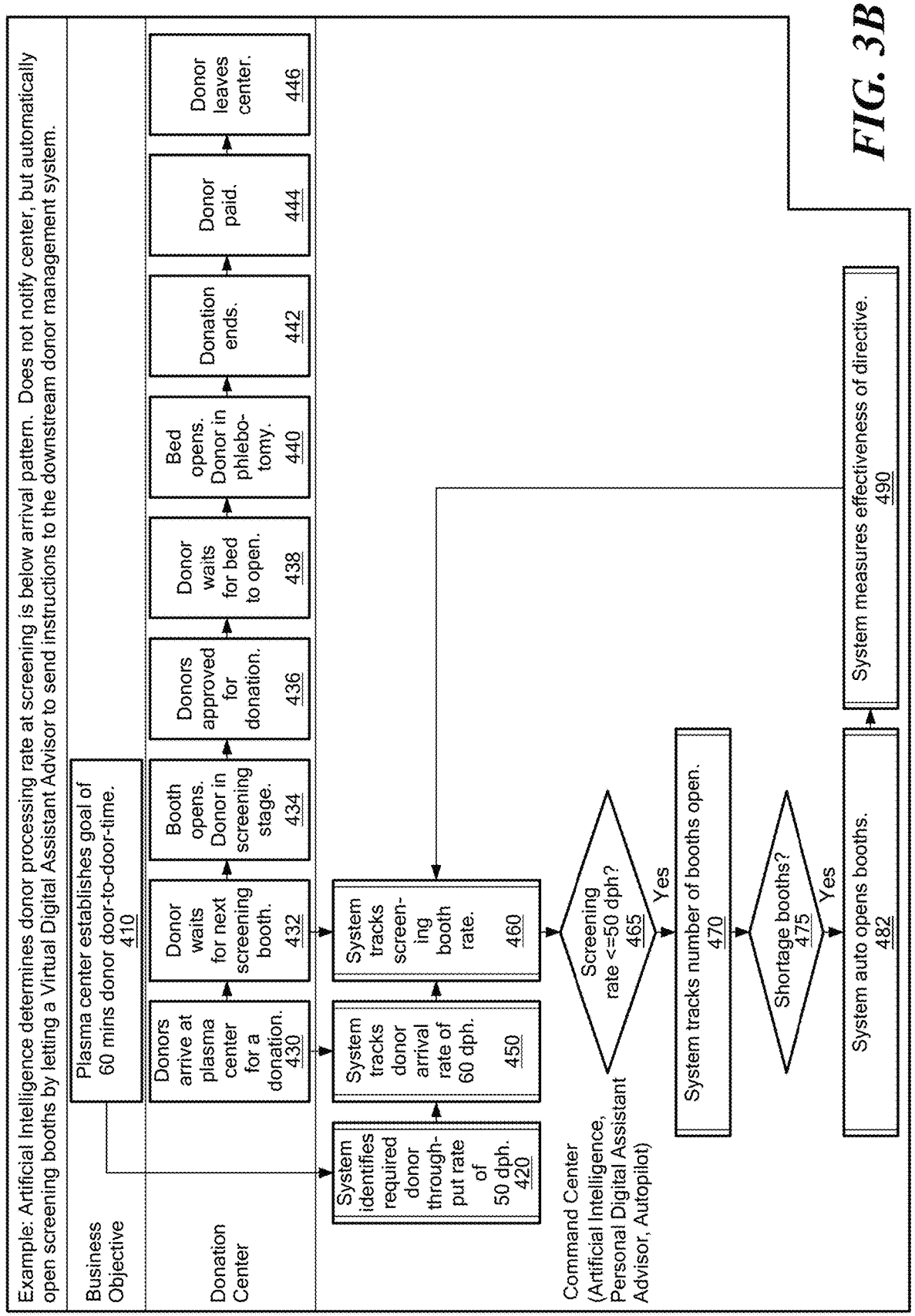

As noted above, in some embodiments, the system 100 may automatically carry out the directive in order to meet the business objective. To that end and as shown in FIG. 3B, rather than create and send the directive to the user and/or plasma center for the user/plasma center to perform, the system 100 can automatically perform the directive. For example, after determining the plasma center has a shortage of booths (Step 475), the system 100 may use the digital assistant 145 to send a message to the donor management system 210 which, in turn, automatically opens additional booths to meet the donor demand and the door-to-door business objective/goal.

Figure 3C:
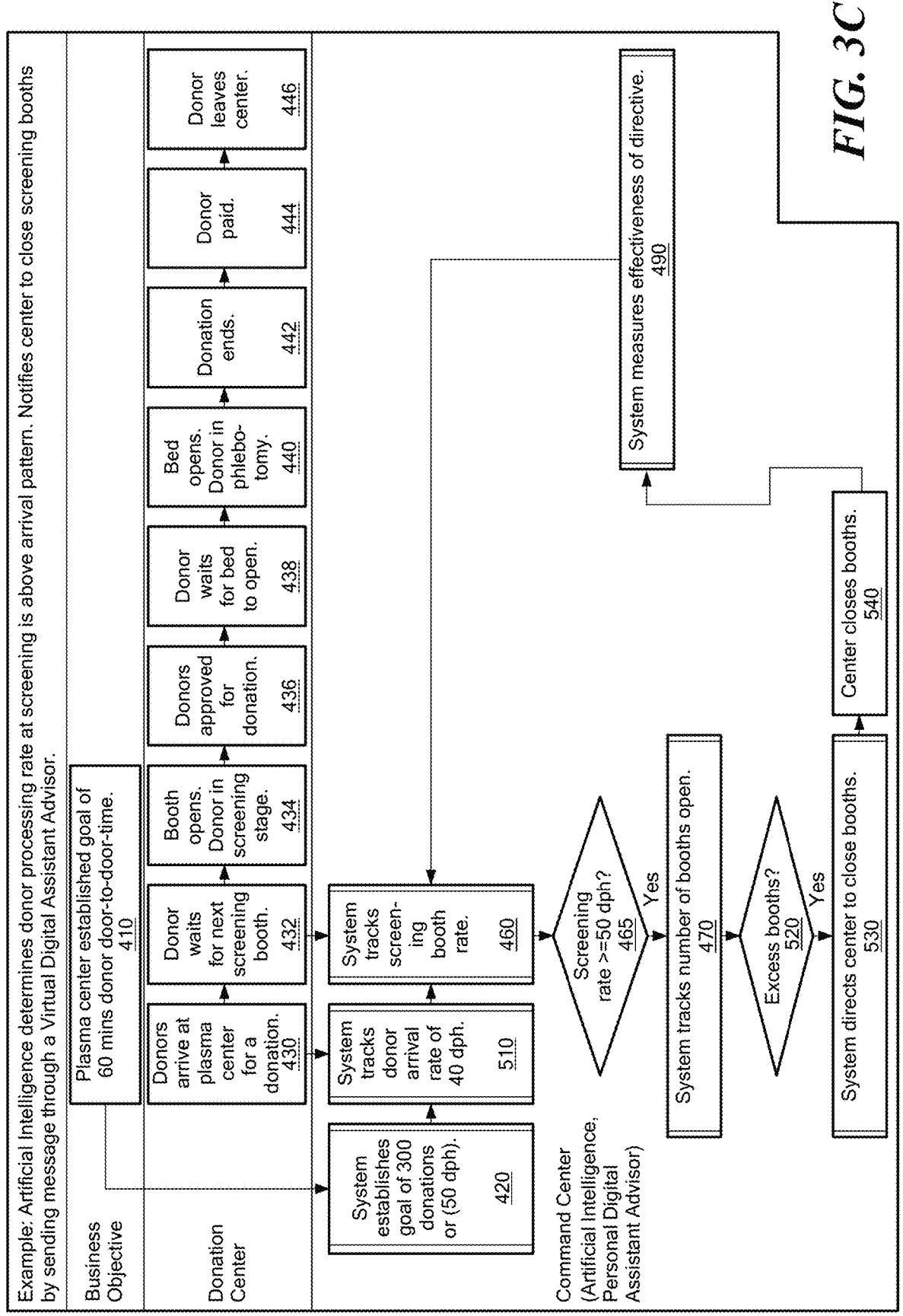
Figure 3D:
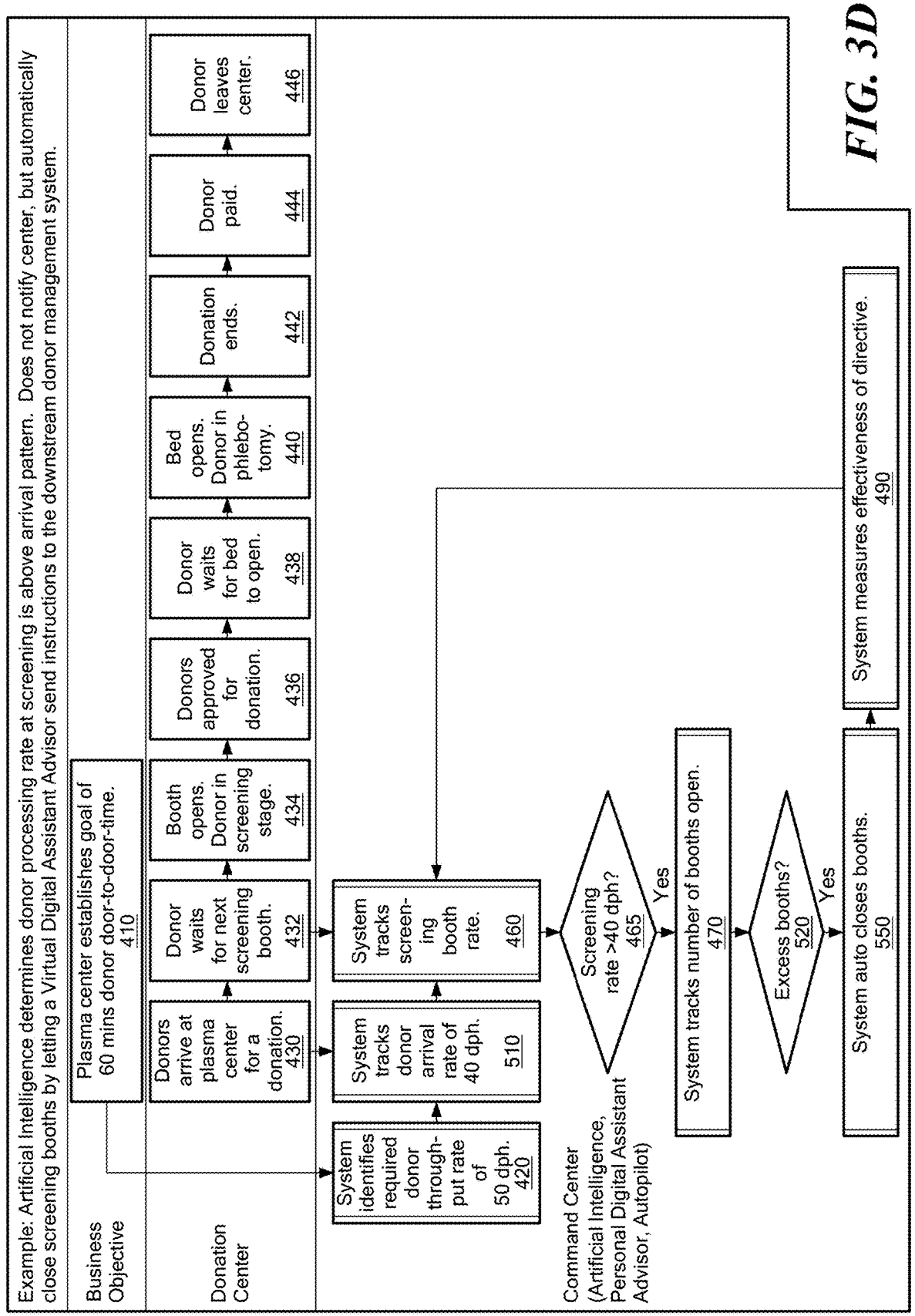

FIGS. 3C and 3D show an additional example in which the donor processing rate during screening is above the donor arrival pattern for the plasma center. In a manner similar to the examples in FIGS. 3A and 3B, the plasma center may set a donor door-to-door goal of 60 minutes (Step 410) and the system 100 may then determine a target number of donations (e.g., 300 per the example in FIG. 3C) and/or a target number of donations/donors per hour (e.g., 50 donors per hour) to meet the business objective/goal set by the plasma center (Step 420). The system 100 may then monitor/track the donor arrival rate (e.g., 40 donors per hour in FIG. 3C) (Step 510) and the screening both rate (Step 460) so that the system may compare the screening rate to the established target. If the screening rate is greater than the target (e.g., 50 donors per hour) (Step 465), the system 100 may track the number of open booths (Step 470) to determine if there is an excess number of booths (Step 520). If there is an excess number of booths, the system 100 may then generate a directive to the user/plasma center to close some of the booths (Step 530). The center may then close the booths as directed by the system 100 (Step 540) and the system 100 may continue to measure the effectiveness of the directive. Alternatively, rather directing the user/plasma center to close the booths, as shown in FIG. 3D, the system 100 may automatically close the booths (Step 550).

Figure 3E:
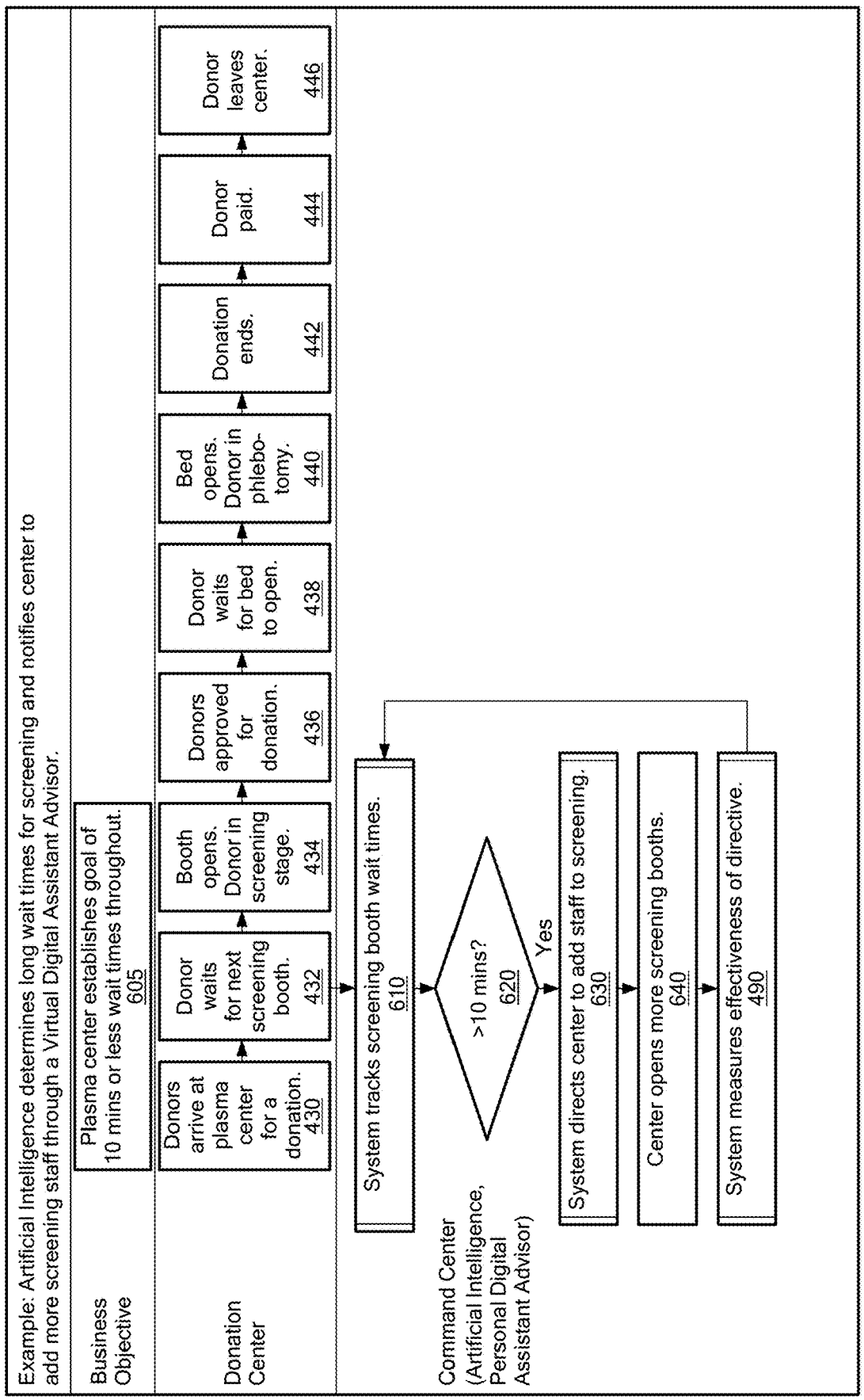

FIG. 3E shows a further example relating to the donor screening process in which the system 100 determines there are long wait times within the plasma center. In this example, the plasma center may set a business objective/goal of a maximum wait time for the donors (e.g., 10 minutes) throughout the donation process (Step 605). The system 100 may then look at the various points in the process to determine if the wait time exceeds the goal. For example, the system 100 may track the screening both wait times (Step 610) and determine if the wait time is greater than the goal (e.g., if it is greater than 10 minutes) (Step 620). The system 100 may then generate a directive to the user/plasma center instructing the plasma center to add additional staff to the screening process (Step 630). The center may then open more screening booths and/or add the additional staff (Step 640) per the directive. The system 100 may then monitor/measure the effectiveness of the directive (Step 490) and make adjustments as necessary. It should be noted that although FIG. 3E only shows the system 100 looking at screening wait times, the system 100 may similarly look at the wait time for a bed/donation machine, wait times for payment, etc.

Figure 4A:
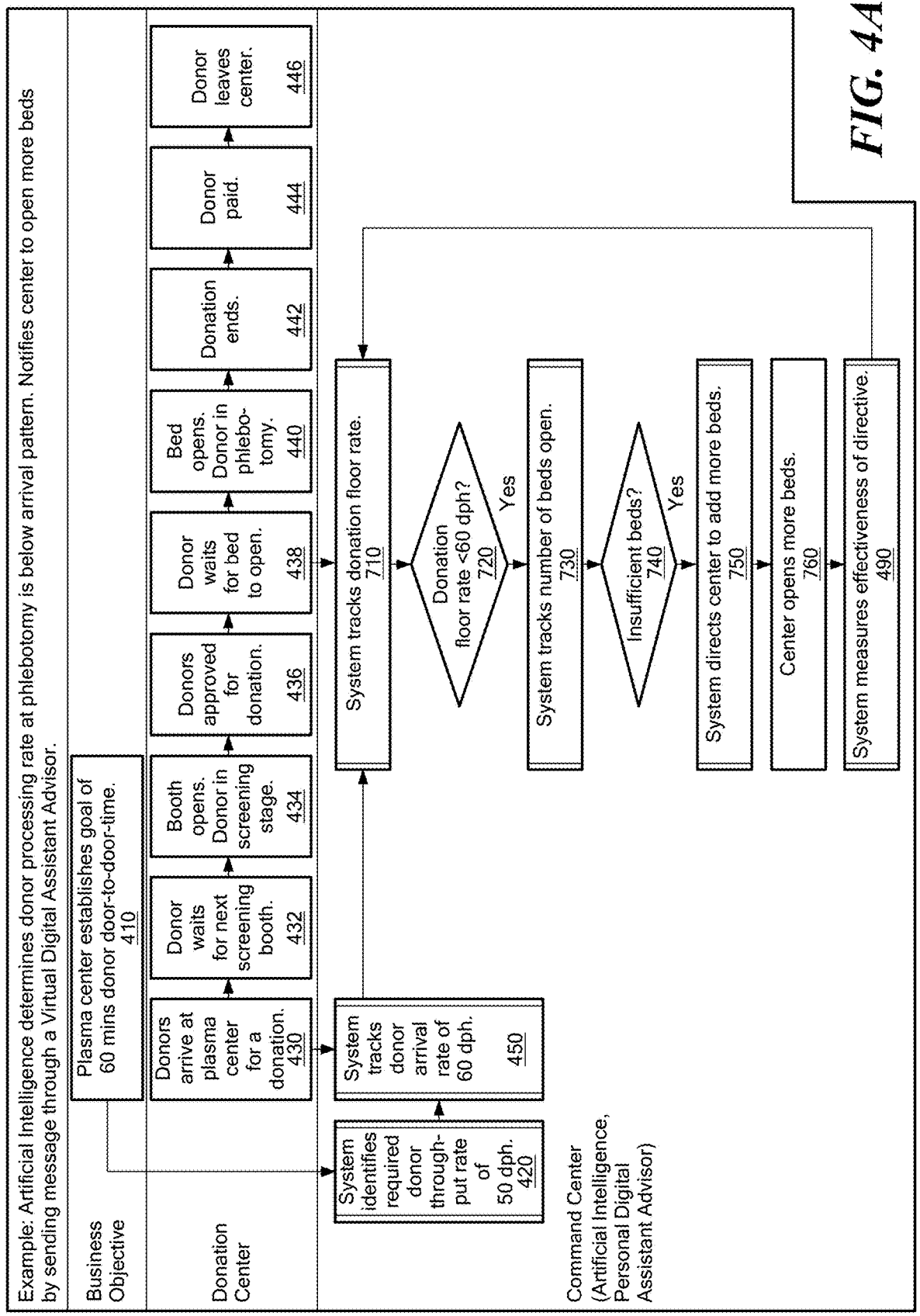
FIGS. 4A-4E schematically show flow diagram examples for various phlebotomy processes, in accordance with embodiments of the present invention.
Figure 5A:
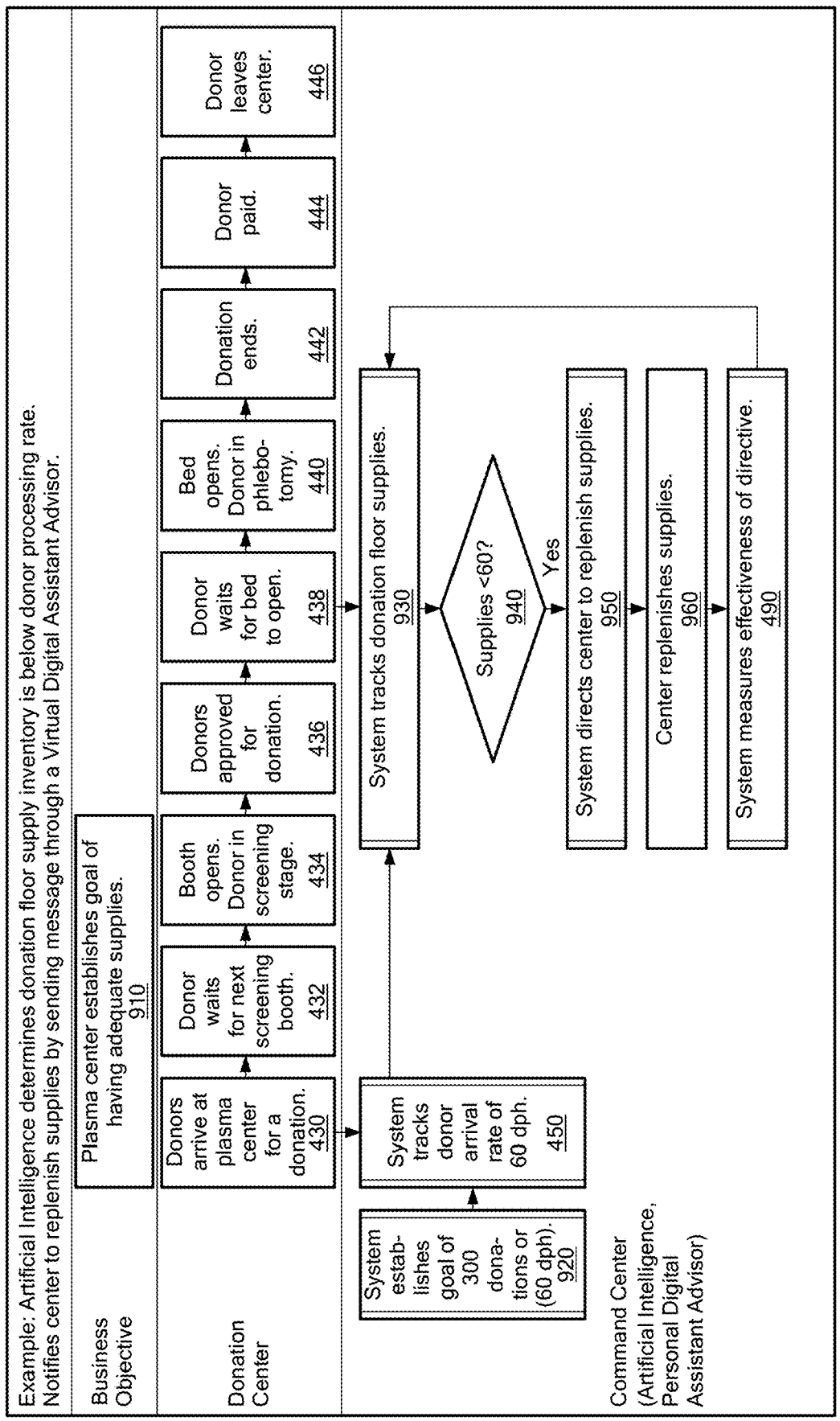
FIGS. 5A-5C schematically show flow diagram examples for various supply inventory processes, in accordance with embodiments of the present invention.
Figure 5B:
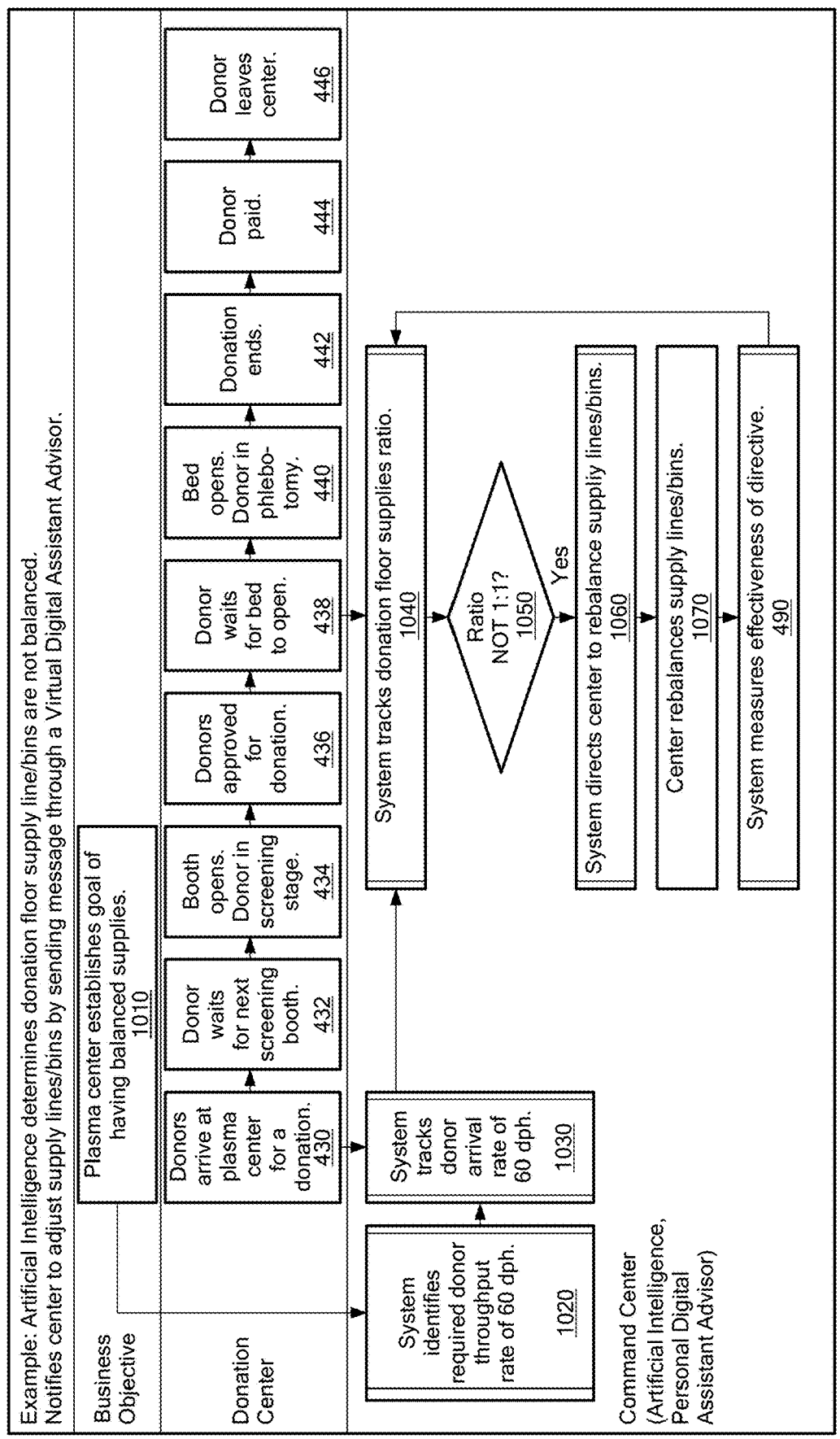
Figure 5C:
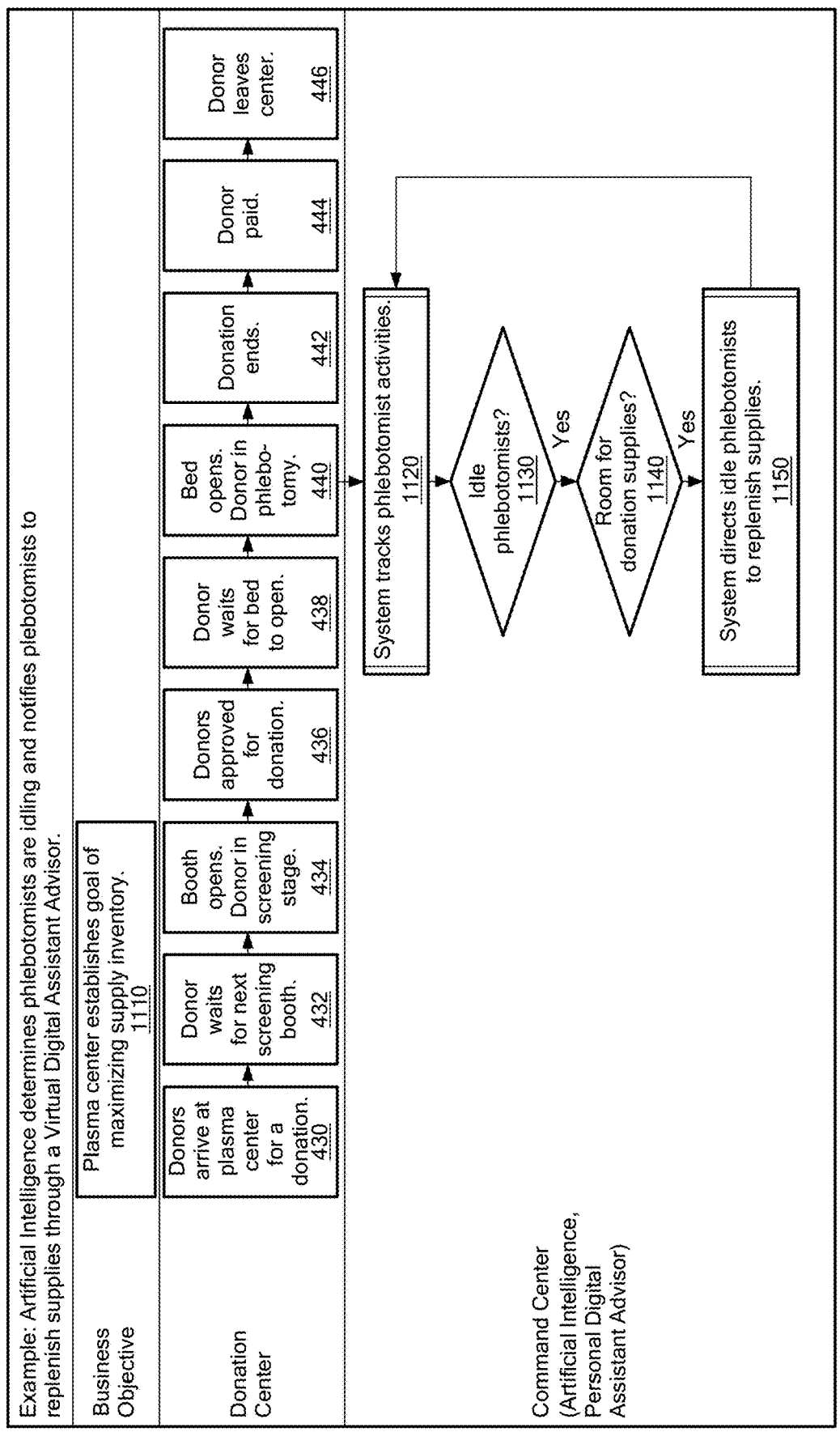

FIG. 4A shows an exemplary use of the system 100 in which the donor processing rate at the phlebotomy stage (e.g., at the point where the donor is waiting for a bed/apheresis device; Step 438) is below an arrival rate. In this example, the business objective set by the plasma center (or inferred by the system 100) may be similar to that of FIGS. 3A and 3B, namely, a donor door-to-door time of 60 minutes (Step 410). Accordingly, in a similar manner to that described above, the system 100 may identify the required donor throughput (Step 420) and may track the donor arrival rate (Step 450). At various points during the donor processing and donation, the system 100 can monitor and track various criteria and/or data. For example, when the donor is waiting for a bed/apheresis device to become available (step 438), the system 100 may track the donor floor rate (e.g., how long the donors are waiting for the bed/apheresis device and how long they are taking to get through the donation process) (Step 710) and if this rate is below the required throughput (e.g., 60 donors per hour) (Step 720), the system 100 will track the number of beds/apheresis devices that are open (Step 730).

Figure 4B:
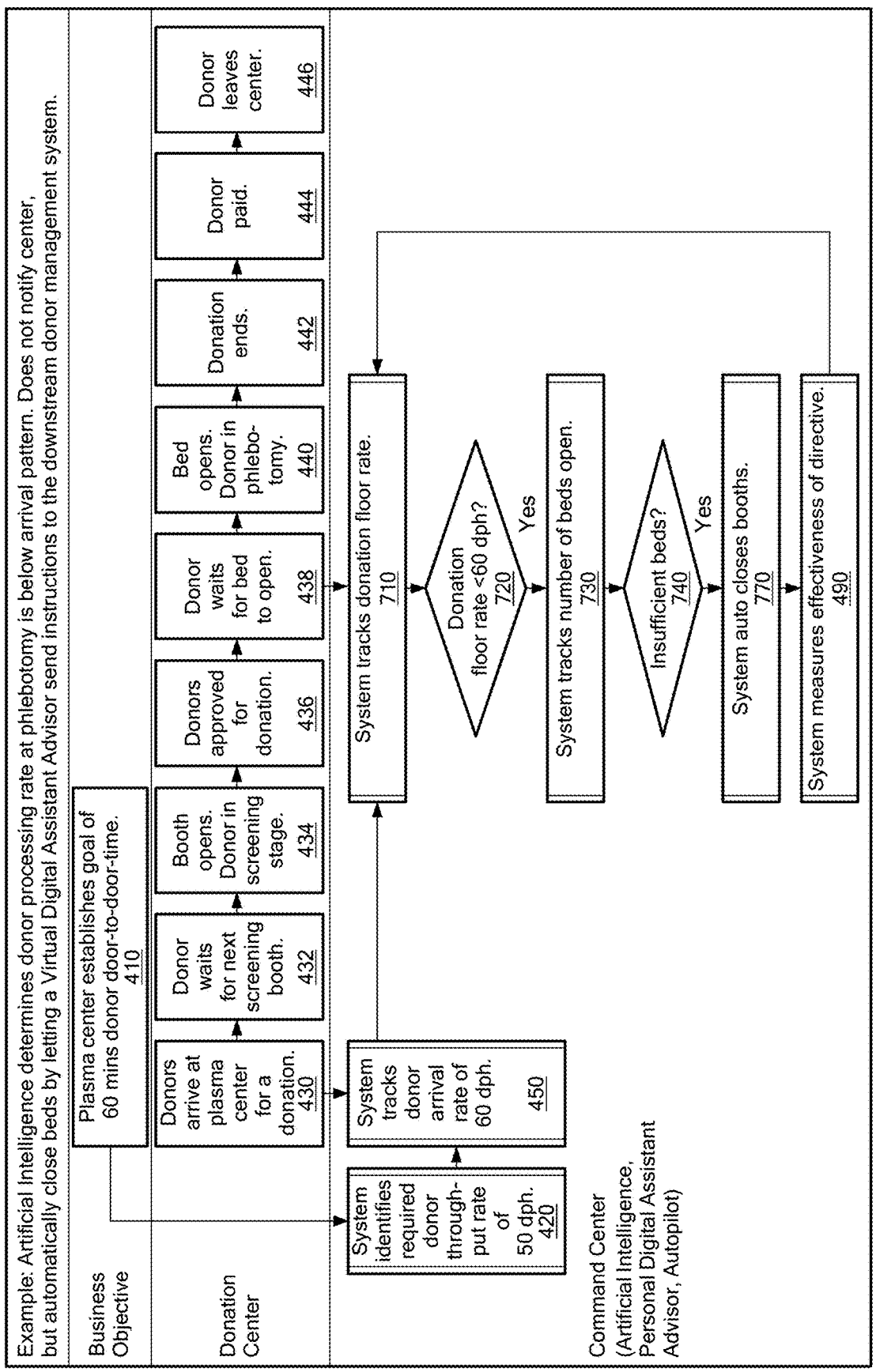

Based on this information and whether or not there are insufficient beds/apheresis devices to handle the flow of donors (Step 740), the system 100 will generate a directive instructing the user/plasma center to add additional beds (Step 750). The plasma center may then add more beds per the directive (Step 760) and the system 100 will continue to monitor/measure the effectiveness of the directive (Step 490). Alternatively, as shown in FIG. 4B, the system 100 may automatically close screening booths (Step 770), for example, by having the virtual digital assistant 145 send instructions to the downstream donor management 210.

Figure 4C:
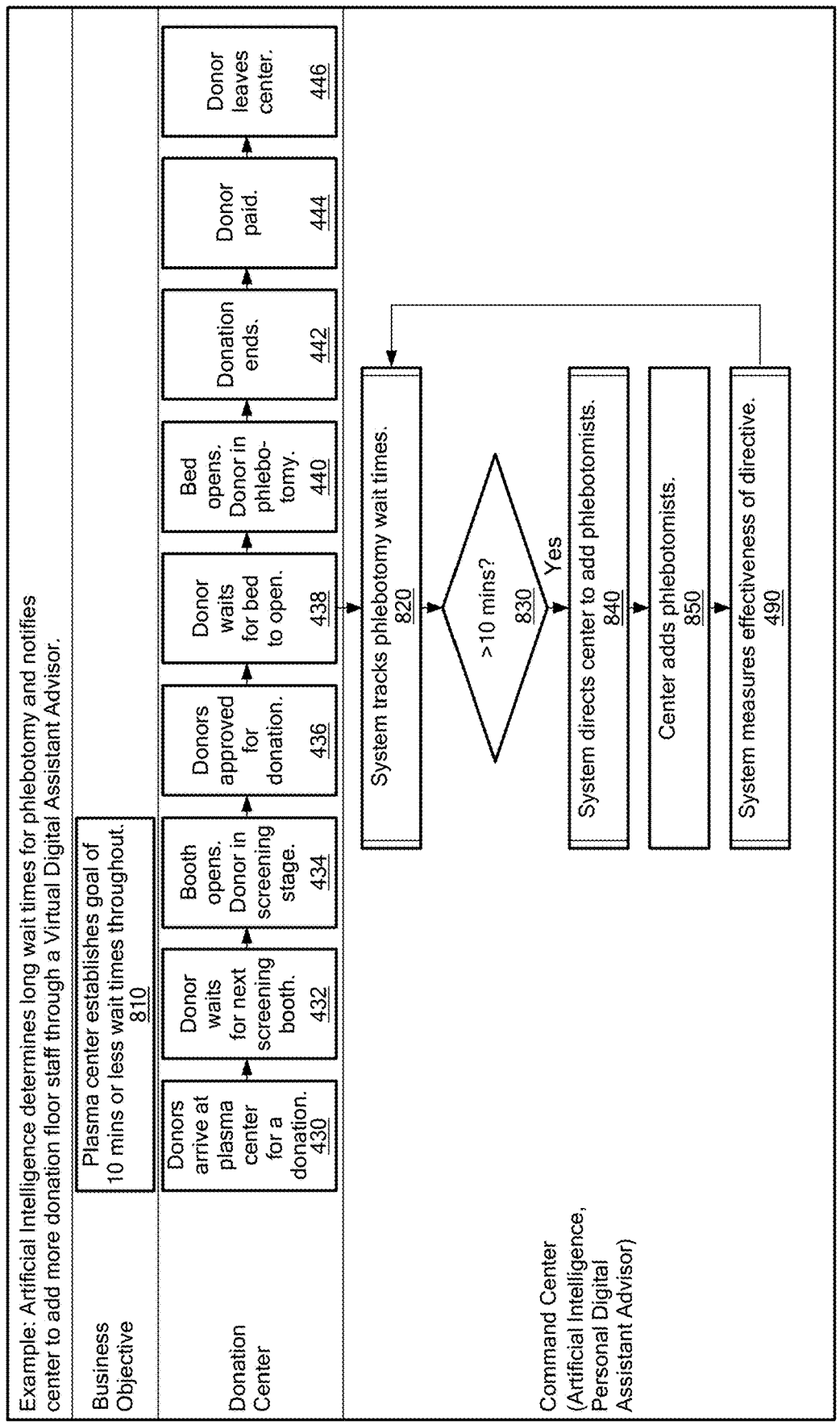
Figure 4D:
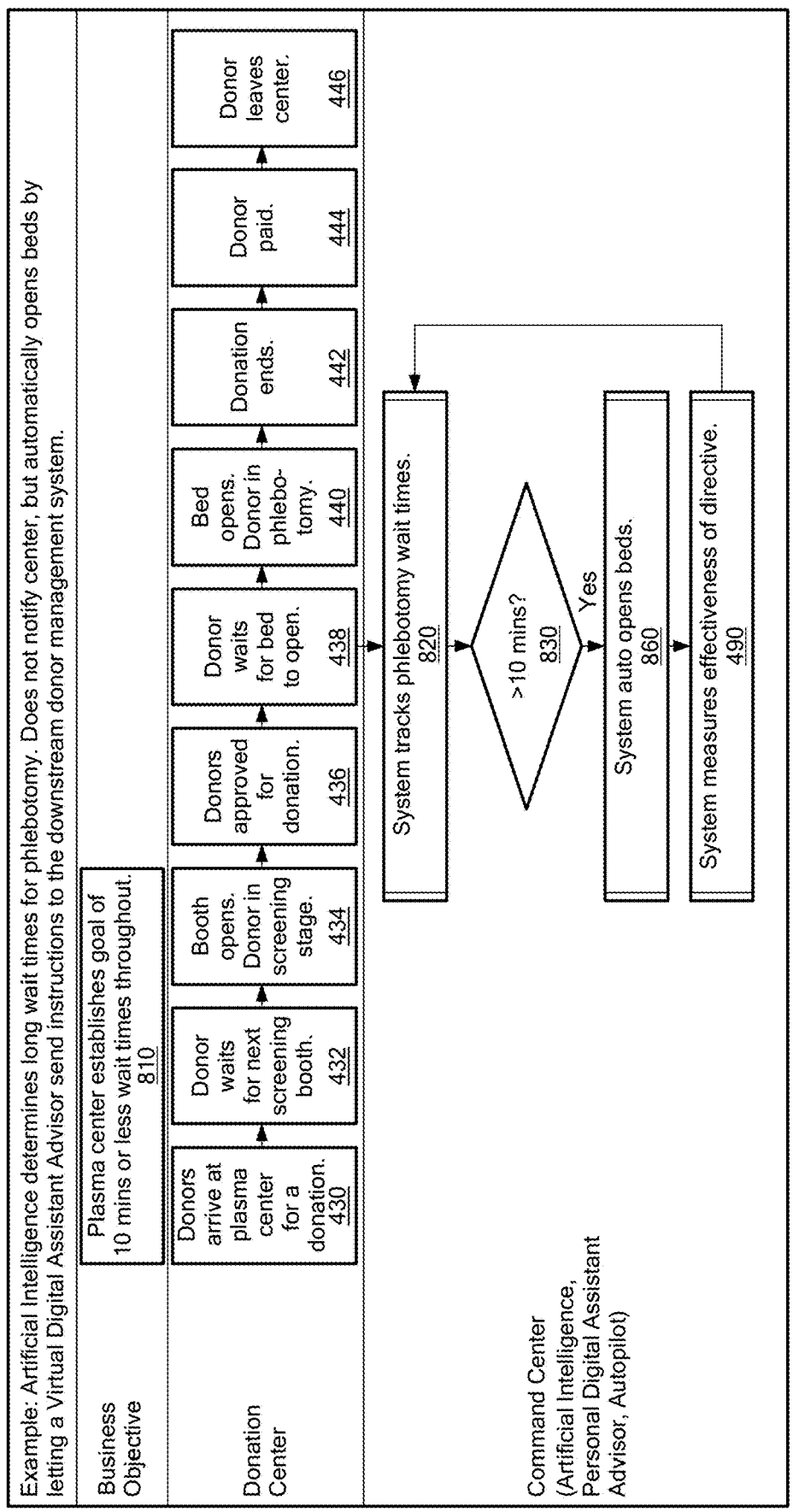

FIGS. 4C and 4D show examples of the system 100 determining that there are long wait times for phlebotomy (e.g., at Step 438) in contradiction to the plasma center's wait time limits/goals (e.g., less than 10 minutes) (Step 810). In such cases, the system 100 may track the phlebotomy wait times (Step 820) and determine if the times are greater than the center's target (e.g., if the times are greater than 10 minutes). If the wait times are over the target/goal, the system 100 will generate a directive instructing the user/plasma center to add phlebotomists to the floor (Step 840), for example, via the digital assistant 145. Alternatively, as shown in FIG. 4D, the system 100 may automatically account for the extended wait times by automatically opening additional beds (e.g., by sending, via the digital assistant 145 instructions to the donor management system 210) (Step 860). In either case, once the center adds the additional phlebotomists and/or additional beds are opened, the system 100 may continue to measure the effectiveness of the directive (Step 490).

Figure 4E:
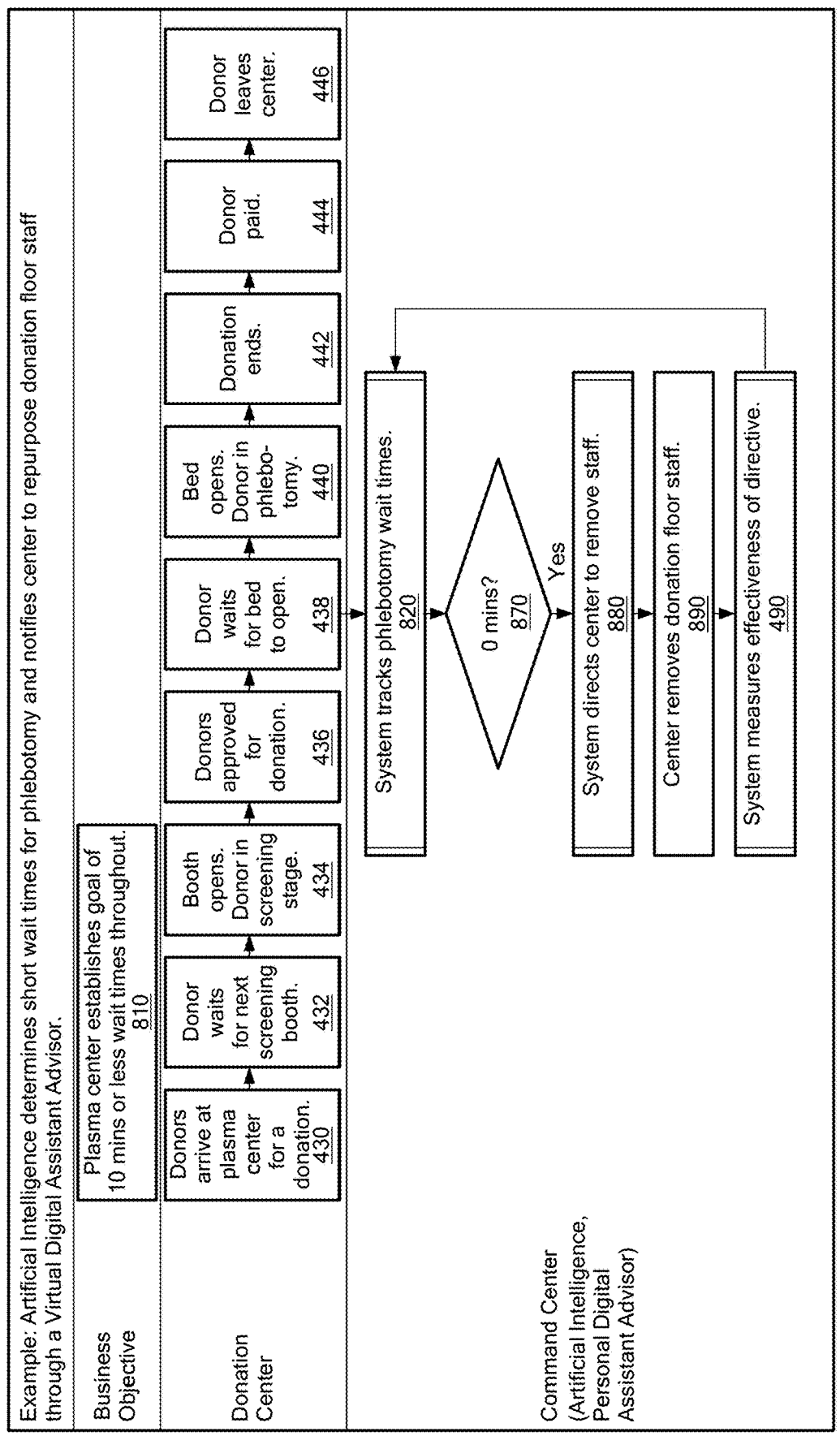

Although FIGS. 4C and 4D deal with cases in which the wait times are too long, in some instances, the wait times may be too short and may be indicative of some inefficiencies and/or over-capacity at the plasma center. In such cases, and as shown in FIG. 4E, the system 100 may track the phlebotomy wait times (Step 820) and, if there is no wait time (e.g., the wait time is 0) (Step 870), the system 100 may generate a directive instructing the user/plasma center to remove staff (or close beds) (Step 880) to reduce any inefficiencies at the center (e.g., idle staff, open beds, etc.). The center may then carry out the directive by removing staff (Step 890) and the system 100 may then continue to monitor/measure the effectiveness of the directive (Step 490).

In addition to monitoring the efficiency and business objectives of the screening process and/or the phlebotomy process, other embodiments may be used to monitor, track and maintain an appropriate inventory of supplies on the plasma center floor. For example, as shown in FIG. 5A, if the plasma center establishes a goal/objective of having adequate supplies available (Step 910), the system 100 may establish a donation goal and/or a donor per hour goal (Step 920), for example, based on known business objectives of the center and may track the donor arrival rate (Step 450) in a manner similar to that discussed above. Then, during the phlebotomy stage (e.g., during step 438), the system 100 may tack the donation supplies available on the floor (Step 930) and determine if the supply availability is insufficient to meet the current need (e.g., if there is not enough to handle 60 donors per hour) (Step 940). If there is an insufficient amount of supplies, the system 100 will generate a directive instructing the user/plasma center to replenish the supplies (Step 950) and send the message/directive to the user/plasma center, for example, via the digital assistant 145. The user/center may then replenish the supplies in response to the received directive (Step 960) and the system 100 may monitor/measure the effectiveness of the directive (Step 490).

In other instances, as shown in FIG. 5B, the plasma center may additionally or alternatively wish to have balanced supplies (e.g., the supply lines and bins are balanced) within the plasma center (Step 1010). Based on this business objective/goal, the system 100 identifies a required donor throughput (e.g., to meet the plasma centers collection goals) (Step 1020) and the system 100 tracks the donor arrival rate (Step 1030). During the phlebotomy stage, for example, when the donor is waiting for beds to open (Step 438), the system 100 may track the donation floor supplies ratio (Step 1040) and determine whether or not the supply is balanced (e.g., the ratio is 1:1) (Step 1050). If it is not balanced, the system 100 generate a directive and direct the center to rebalance the supply lines and bins (Step 1060) and, in response, the center may balance the supplies (Step 1070). To ensure that the directive is effectively working, the system 100 may continue to monitor/measure the effectiveness (Step 490).

FIG. 5C shows a further example in which the system 100 tracks the phlebotomists activities and instructs them to perform alternative tasks such as replenishing supplies. In this example, the plasma center may once again set a business objective/goal of maximizing supply inventory (Step 1110). Then, during the phlebotomy stage (e.g., when the donors are in the bed; step 440), the system 100 may track the activities of the phlebotomists (Step 1120) to determine if any of the phlebotomists are idle (Step 1130). If, there are idle phlebotomists, the system 100 may then determine if there is sufficient room for additional supplies on the floor (Step 1140) and, if so, the system 100 may direct the idle phlebotomists to replenish the supplies (Step 1150).

It important to note that the FIGS. 3A-3E, 4A-4E and 5A-5C merely show examples of how the system 100 may be used to meet various business objectives of the plasma centers. The system 100 may be used for any number of additional examples and business directives. Additionally, the system 100 may be used simultaneously to achieve multiple business directives at any given time.

It should be noted that terms such as "controller," "processor" and "server" may be used herein to describe devices that may be used in certain embodiments of the present invention and should not be construed to limit the present invention to any particular device type or system unless the context otherwise requires. Thus, a system may include, without limitation, a client, server, computer, appliance, or other type of device. Such devices typically include one or more network interfaces for communicating over a communication network and a processor (e.g., a microprocessor with memory and other peripherals and/or application-specific hardware) configured accordingly to perform device and/or system functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies, networking technologies, and internetworking technologies The various components of the control program may be implemented individually or in combination. For example, each component may be implemented or a dedicated server or a set of servers configured in a distributed manner It should also be noted that devices may use communication protocols and messages (e.g., messages created, transmitted, received, stored, and/or processed by the system), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, interfaces, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other programmable logic device (PLD)), discrete components, integrated circuitry (e.g., an Application Specific Integrated Circuit (ASIC)), or any other means including any combination thereof. In some embodiments of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). In fact, some embodiments, may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computing device-implemented method for generating a directive for maintaining an objective, the computing device including at least one processor, the method comprising:

integrating a control center system with a plurality of healthcare provider data systems;

obtaining information from at least one of the plurality of healthcare provider data systems associated with one or more plasma or blood donation centers, the obtained information selected from a group consisting of timing data, telemetry data, performance data, quality data, cost data, volume data, quantity data, rate data, personnel data, donor data, donation data, productivity data, performance data, and speed data;

training an artificial intelligence module using the obtained information to identify active conditions or forecast emerging conditions related to the operational performance of the plasma or blood donation centers;

correlating, using the trained artificial intelligence module, the obtained information against an identified business objective of at least one plasma or blood donation center, the business objective including one or more of productivity objectives, performance objectives, efficiency objectives and/or quality objectives;

determining, based on the correlating, that the business objective is not being met;

generating, using a heuristic model, a directive including at least one instruction to the at least one plasma or blood donation center in order to achieve the identified business objective; and presenting the directive to at least one user and/or user system such that the directive may be carried out by the at least one user and/or user system.

2. The method according to claim 1, wherein integrating the control center system with the plurality of healthcare provider data systems includes is autonomously integrating the control center system.

3. The method according to claim 1, wherein the data systems are selected from a group consisting of a donor system, a screening system, a collection system, an equipment system, a supplies system, an inventory system, a testing system, a shipping system, a quality system, a payment system, a marketing system, a recruitment system, an engagement system, a warehouse system, a payroll system, a time-tracking system, and a security system.

4. The method according to claim 1, wherein the business objective is an inferred profile of the at least one plasma or blood donation center based on historical information from the plurality of healthcare providers data systems.

5. The method according to claim 1, further comprising:
receiving a company profile containing productivity objectives, performance objectives and/or quality objectives, the business objective being based, at least in part on, at least one of the productivity objectives, performance objectives and/or quality objectives.

6. The method according to claim 1, wherein the business objective includes a received company profile containing location-specific profiles.

7. The method according to claim 1, wherein the business objective includes a received company profile containing time-dependent profiles.

8. The method according to claim 1, wherein the business objective is measurable.

9. The method according to claim 1, wherein the directive includes information regarding at least one step to take to achieve the business objective.

10. The method according to claim 9, wherein the directive information is location-specific to achieve the business objective.

11. The method according to claim 1, wherein the directive is presented to a plurality of users via at least one selected from the group consisting of e-mail, a SMS, a push notification, a telephone call, a social media publication, a visual feedback, an audible feedback, and a haptic feedback.

12. The method according to claim 1, wherein the directive is presented to the plurality of user systems via an electronic interface.

13. The method according to claim 12, wherein the electronic interface is automated.

14. The method according to claim 1, wherein the directive is presented to the plurality of user systems via a user performed manual file upload.

15. The method according to claim 1, wherein the directive is presented to the plurality of users such that the directive can be accessed from a group consisting of a cellphone, a tablet, a computer, a laptop, a personal digital assistant, a digital display, a smart watch, a telephone, a pager, or a public-address system.

16. The method according to claim 1, further comprising:
storing, in a data storage device, the information from the plurality of healthcare provider data systems.

17. The method according to claim 1, wherein obtaining the information from the plurality of healthcare provider data systems including extracting, using a data extractor, the information from the plurality of healthcare provider data systems.

18. The method according to claim 1, wherein the plurality of healthcare provider data systems includes a donor management system.

19. The method according to claim 1, wherein generating the directive includes identifying gaps between at least one production metric based on the obtained information and the business objective.

20. The method according to claim 1, further comprising:
receiving, from a user, an acknowledgment that the user has taken ownership of implementing the directive.

21. The method according to claim 1, further comprising:
monitoring, using artificial intelligence, an effectiveness of the directive against the business objective.

22. A system for generating a directive for maintaining an objective comprising:
at least one processor;
an integrator executed by the at least one processor and configured to integrate a control center system with at least one healthcare provider data system associated with one or more plasma or blood donation centers;
a data extractor executed by the at least one processor and configured to search the at least one healthcare data system for production data and retrieve the production data from the at least one healthcare provider data system, the obtained information selected from a group consisting of timing data, telemetry data, performance data, quality data, cost data, volume data, quantity data, rate data, personnel data, donor data, donation data, productivity data, performance data, and speed data;
a data storage device configured to store the retrieved production data;
an artificial intelligence module executed by the at least one processor and trained using the obtained information, wherein the trained artificial intelligence module correlates the retrieved production information against an identified business objective and generates a directive including at least one instruction to achieve the identified business objective, the business objective including one or more of productivity objectives, performance objectives, efficiency objectives and/or quality objectives; and
a virtual digital assistant configured to process the directive and distribute the directive to at least one recipient so that the recipient may carry out the directive.

23. A system according to claim 22, wherein the artificial intelligence module generates the directive using an heuristics model.

24. A system according to claim 22, wherein the at least one recipient is at least one user and/or at least one donor management system.

25. A system according to claim 22, wherein the integrator is configured to autonomously integrate the control center system with the at least one healthcare provider data system.

26. A system according to claim 22, wherein the at least one healthcare provider data system includes at least one selected from a group consisting of a donor system, a screening system, a collection system, an equipment system, a supplies system, an inventory system, a testing system, a shipping system, a quality system, a payment system, a marketing system, a recruitment system, an engagement system, a warehouse system, a payroll system, a time-tracking system, and a security system.

27. A system according to claim 22, wherein the business objective is an inferred profile of the healthcare provider based on historical information from the at least one healthcare provider data systems.

28. A system according to claim 22, wherein the business objective is based, at least in part on, at least one of the productivity objectives, performance objectives and/or quality objectives contained within a company profile.

29. A system according to claim 22, wherein the business objective is measurable.

30. A system according to claim 22, wherein the directive includes information regarding at least one step to take to achieve the business objective.

31. A system according to claim 22, wherein the directive contains location-specific information to achieve the business objective.

32. A system according to claim 22, wherein the virtual digital assistant distributes the directive via at least one selected from the group consisting of e-mail, a SMS, a push notification, a telephone call, a social media publication, a visual feedback, an audible feedback, and a haptic feedback.

33. A system according to claim 22, further comprising a network interface, the virtual digital assistant configured to distribute the directive to a plurality of user systems via the network interface.

34. A system according to claim 22, wherein the directive is distributed to a plurality of user systems via a user performed manual file upload.

35. A system according to claim 22, wherein the directive is distributed to the at least one recipient such that the directive can be accessed from a group consisting of a cellphone, a tablet, a computer, a laptop, a personal digital assistant, a digital display, a smart watch, a telephone, a pager, or a public-address system.

36. A system according to claim 22, wherein the plurality of healthcare provider data systems includes a donor management system.

37. A system according to claim 22, wherein the artificial intelligence module is configured to identify at least one gap between at least one production metric and the business objective, the directive being based, at least in part on the at least one gap.

38. A system according to claim 22, further comprising a directive listener executed by the at least one processor and configured to monitor, using artificial intelligence, an effectiveness of the directive against the business objective.

39. A system according to claim 22, further comprising a network interface configured to receive acknowledgement that the directive was (a) received by the user or (b) received by the user system.

40. A non-transitory computer recordable medium having computer executable instructions, that when executed on a computing device that includes at least one processor, performs actions comprising:
   obtaining location-specific information regarding a plurality of locations associated with one or more plasma or blood donation centers, the location-specific information selected from a group consisting of timing data, telemetry data, performance data, quality data, cost data, volume data, quantity data, rate data, personnel data, donor data, donation data, productivity data, performance data, and speed data;
   correlating the location-specific information with a plurality of time-specific information using an artificial intelligence module executed by the at least one processor and trained with the obtained location-specific information to identify active conditions or forecast emerging conditions related to the operational performance of the plasma or blood donation centers;
   identifying a business objective of at least one of the plasma or blood donation centers with a plurality of directives, the business objective including one or more of productivity objectives, performance objectives, efficiency objectives and/or quality objectives;
   selecting directives that pertain to the business objective based on (a) the location for which the business objective pertains and/or (b) the time for which the business objective pertains; and
   providing for (a) review by the user and/or (b) execution by a user system the directives for achieving the business objective.

* * * * *